(12) United States Patent
Utsumi et al.

(10) Patent No.: US 6,748,527 B1
(45) Date of Patent: Jun. 8, 2004

(54) DATA PROCESSING SYSTEM FOR PERFORMING SOFTWARE INITIALIZATION

(75) Inventors: Hiroyuki Utsumi, Kawasaki (JP); Yoshio Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 09/666,593

(22) Filed: Sep. 20, 2000

(30) Foreign Application Priority Data

Jan. 14, 2000 (JP) .......................................... 2000-006823

(51) Int. Cl.[7] .............................................. G06F 9/445

(52) U.S. Cl. .......................................................... 713/2

(58) Field of Search ........................ 713/1, 2; 709/220, 709/222

(56) References Cited

U.S. PATENT DOCUMENTS

| | | | | |
|---|---|---|---|---|
| 5,361,365 A | * | 11/1994 | Hirano et al. .................... | 713/1 |
| 5,802,003 A | * | 9/1998 | Iadanza et al. ........ | 365/230.03 |
| 6,192,469 B1 | * | 2/2001 | Smalley et al. ................. | 713/1 |
| 6,473,853 B1 | * | 10/2002 | Spiegel et al. .................. | 713/1 |

* cited by examiner

*Primary Examiner*—Thomas M. Heckler
(74) *Attorney, Agent, or Firm*—Staas & Halsey LLP

(57) ABSTRACT

A command fetch control section 1 has an address selection function of selecting the start address of an initialization program stored in a local memory (RAM 6) or an external memory (ROM 9) connected through external buses 7 and 8, based on an address selection signal MS externally given. When a processor 10 in which one or both of the supplies of its internal clocks bck and cck have been stopped after the system wad powered on, is to be restarted, the processor 10 can read out the initialization program necessary for its restarting operation from the high-speed RAM 6. Thus the restarting operation can be performed rapidly.

27 Claims, 12 Drawing Sheets

DATA PROCESSING SYSTEM FOR PERFORMING SOFTWARE INITIALIZATION

BACKGROUND OF THE INVENTION

1. Field of the Invention

The present invention relates to data processing systems, particularly to data processing systems provided with processors having a function of generating a start address of a program for initialization in response to a reset signal, and executing commands fetched in accordance with the start address, to set the internal state of the device proper.

2. Description of the Related Art

When a device provided with a microprocessor is powered on, the microprocessor performs a reset operation for initializing the internal state of the processor, in response to a reset signal externally given. In the reset operation, initialization in hardware is first performed in which the stored data of each memory element provided in the processor is initialized, and then initialization in software is performed in which a program for initialization is read out from an external memory, and the program is executed to set various application programs in their executable states.

The hardware initialization starts when the reset signal is asserted. When the reset signal is negated, the software initialization starts. The software initialization is performed with fetching commands of the initialization program from the address designated by a reset vector. In general, the initialization program is stored in a read-only memory (hereinafter referred to as ROM) externally connected to the processor through a bus.

In the software initialization, the processor gives the ROM a read request address via the bus. A sequence of commands of the initialization program is then read out in order and supplied to the processor via the bus. The processor having received the commands sets proper values to meet the system, in various setting registers provided in the processor, in accordance with the respective supplied commands. The processor thereby sets up an environment in which each application program is executable.

A multiprocessor system is known which includes processors connected to a common bus. The processors are made up from one master processor and the remaining slave processors, and each of the processors performs such a reset operation as described above. To reset the whole of this multiprocessor system, every processor must perform its reset operation.

For this purpose, a reset signal is asserted to all the processors, and thereby every processor performs its hardware initialization. After the reset signal is asserted for a time necessary and sufficient for initializing the stored data of the memory elements in every processor, the reset signal is negated to all the processors.

When the reset signal is negated, all the processors try to access a ROM at once, in accordance with the address designated by a reset vector, in order to perform their software initializations. The ROM connected to the common bus, however, can not simultaneously receive the accesses of the processors. Thus the processors access the ROM in order through arbitration on the common bus (bus arbitration), to read out a sequence of commands of a program necessary for software initialization.

In a system including a processor which performs such a reset operation, it is also proposed that the clock supply is stopped in the processor to reduce the power consumption of the system when the processor is out of operation even after the system is powered on. For example, in such a multiprocessor system as described above, there is the state that the master processor is in operation and the slave processors are out of operation. In this state, the clock supply in each slave processor is stopped to reduce the power consumption.

When a processor in which the clock supply is stopped is required to operate, the clock supply is restarted to start the processor. In this case, the processor being started performs its hardware initialization in response to an assertion of a reset signal, and then its software initialization in response to a negation of the reset signal. In the software initialization, the processor accesses a ROM via a bus, and reads out a sequence of commands of a necessary initialization program.

In such a conventional system as described above, however, the software initialization, which is performed subsequently to the hardware initialization, requires an access to the ROM, which is a low-speed memory device, via the bus to obtain the program necessary for the initialization. As a result, the reset operation takes a long time.

Particularly in a system in which the clock supply in a processor is temporarily stopped to reduce power consumption, if the processor is frequently stopped and started, an access to a low speed ROM must be made in every start operation. This brings about an increase in vain time for waiting for the start of the system.

Besides, in a multiprocessor system as described above wherein processors are connected to a common bus, a ROM which stores the initialization programs for the respective processors, is connected to the common bus. When accesses from the processors to the ROM concur, bus arbitration is made so that the processors may access the low speed ROM in order. Thus the time for initializing all the processors increases considerably.

Besides, in such a multiprocessor system, the respective processors are assigned different roles in general. The manners of their software initializations differ accordingly. The processors, therefore, use different programs for their software initializations. In this system, required is means for judging as to which of the different programs stored in the ROM each processor uses. As a result, the system construction becomes complicated.

SUMMARY OF THE INVENTION

It is an object of the present invention to provide data processing systems wherein the software initialization of a processor can be performed more rapidly.

It is another object of the present invention to provide data processing systems wherein the software initialization of a processor can be performed with a simpler construction.

According to an aspect of the present invention, a data processing system in which initialization in software is performed with a necessary initialization program read out from a memory after initialization in hardware has been performed in response to a reset signal, comprises an address selecting section for selecting the start address of the initialization program stored in a local memory or an external memory connected through a bus, on the basis of an address selection signal.

In this feature, when a processor in which the supply of its internal clock has been stopped after the system was powered on, is to be restarted, the processor can read out an initialization program necessary for its restarting operation, from the high-speed local memory. Thus the restarting operation can be performed rapidly. Thereby realized is a rapid restart from a state of stopping the clock for reducing the power consumption of the system.

According to another aspect of the present invention, a data processing system in which initialization in software is performed with a necessary initialization program read out from a memory after initialization in hardware has been performed in response to a reset signal, comprises an access inhibiting section for inhibiting any access request to the memory storing the initialization program, on the basis of a start inhibiting signal.

In this feature, the initialization program stored in an external memory connected through an external bus, can be transferred to a local memory while inhibiting any access request to the local memory. By this manner, in the start processing sequence when the system is powered on, the initialization program for the starting operation can be read out from the high-speed local memory, without necessity of accessing the external memory. Besides, there is no case that processors connected to the external bus start to access the external memory at once. Therefore, arbitration on the common bus becomes unnecessary, and accordingly a rapid starting operation can be performed.

Besides, in case of a multiprocessor system, means for judging as to which program each processor is to execute, becomes unnecessary. Therefore, the system construction can be simplified.

DETAILED DESCRIPTION OF THE PREFERRED EMBODIMENTS

Hereinafter, embodiments of the present invention will be described with reference to the accompanying drawings.

Figure 1:
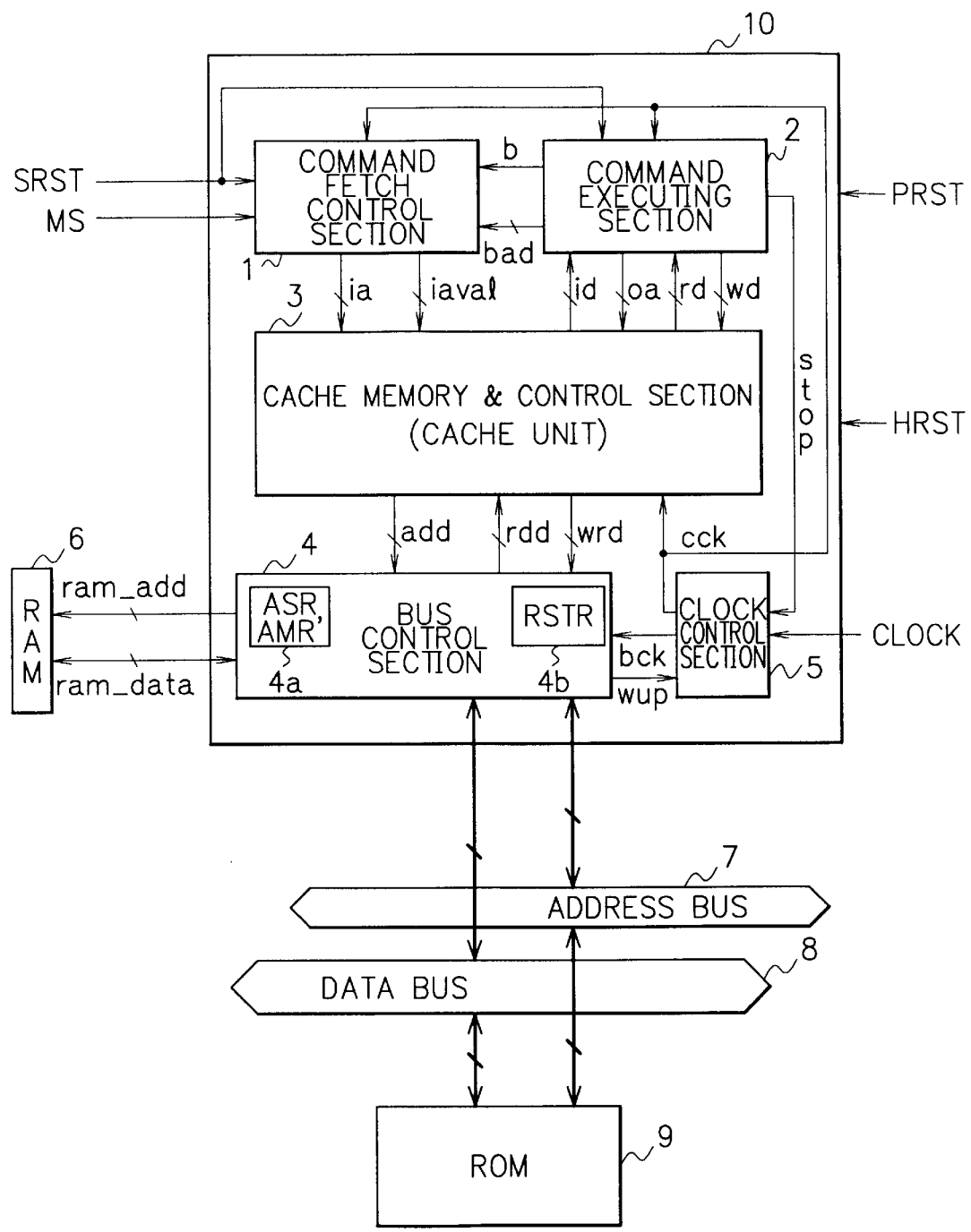
FIG. 1 is a block diagram showing the construction of a processor in a data processing system according to the first embodiment of the present invention.

FIG. 1 is a block diagram showing the construction of a processor in a data processing system according to the first embodiment of the present invention.

The processor 10 according to this embodiment comprises a command fetch control section 1 for controlling the operation of reading out commands of a program from a memory and fetching them, a command executing section 2 for interpreting the fetched commands and executing them, a cache memory with its control section (hereinafter referred to as cache unit) 3 for holding a duplicate of stored data of a memory to assist in a high speed memory access, a bus control section 4 for controlling a random access memory (RAM) 6 as a local memory, and external buses such as an address bus 7 and a data bus 8, and a clock control section 5 for generating internal clocks bck and cck based on a clock CLOCK externally given, and distributing them.

A ROM 9 as an external memory is connected to the external buses 7 and 8. The ROM 9 stores an initialization program necessary for the software initialization of the processor 10. Although the ROM 9 is provided as an external memory in this example, the present invention is not limited to this feature. The RAM 6 is generally used as a work memory of the processor 10. When necessary, the initialization program is transferred from the ROM 9 via the external buses 7 and 8, and stored in the RAM 6.

The cache memory in the cache unit 3 is a buffer memory which can operate at a high speed but has a small capacity, for holding a duplicate of stored data of an external memory connected to the processor 10. When the cache memory holds the duplicate of the stored data of the external memory, the command executing section is supplied with the data from the cache memory. Since the cache memory is not essential to the present invention, its detailed description will be omitted. In this embodiment, a store-through type cache memory is used.

The command fetch control section 1 generates the address in the memory at which a command of the initialization program to be executed by the processor 10, and issues it as a request command address ia to the cache unit 3, together with a command fetch request iaval. At this time, the command fetch control section 1 selects one of start addresses of the RAM 6 as a local memory and the ROM 9 as an external memory on the basis of an address selection signal MS externally given, to make the request command address ia. That is, this command fetch control section 1 includes an address selection section according to the present invention.

The cache unit 3 having received the command fetch request iaval from the command fetch control section 1, uses the request command address ia attendant upon the command fetch request iaval, to check as to whether an effective entry is present in the cache memory or not. When there is a cache hit, the cache unit 3 reads out the corresponding data from the cache memory, and supplies it as command data id to the command executing section 2. When no effective entry is present in the cache memory and so the check results in cache miss, the cache unit 3 supplies the command fetch request and a request address add to the bus control section 4.

The bus control section 4 selectively requests data read to one of the RAM 6 and the ROM 9, in accordance with the received request address add. More specifically, the bus control section 4 includes an area designation register 4a for holding information for designating an address area of the RAM 6. The area designation register 4a holds information on the top address ASR and the area size AMR of an area. In accordance with whether or not the address area of the RAM 6 defined by a combination of the top address ASR and the area size AMR contains the request address add received from the cache unit 3, the bus control section 4 requests data read to the RAM 6 or the ROM 9.

Figure 2:
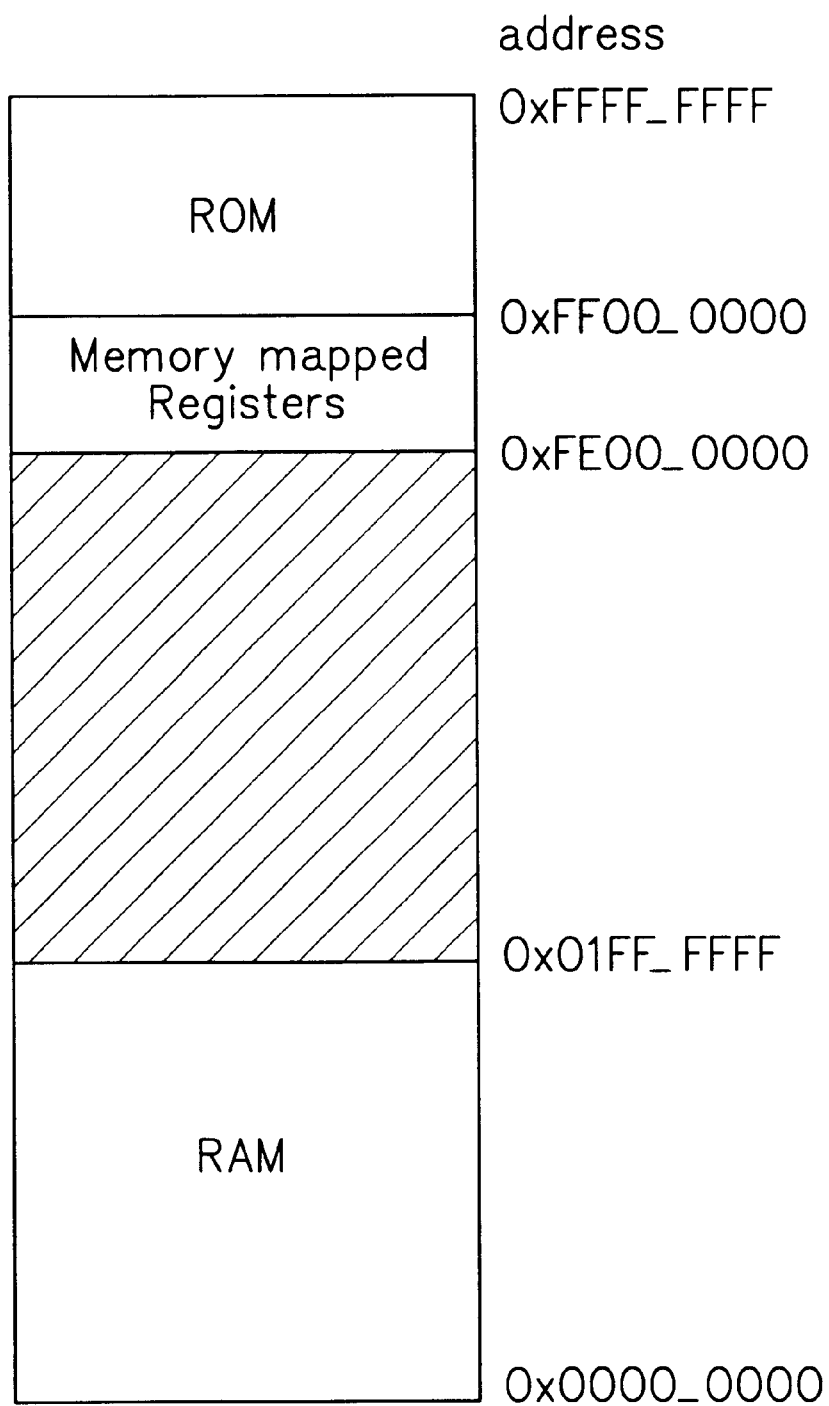
FIG. 2 is a representation showing a memory map of the whole system including a RAM, a ROM, and registers.

FIG. 2 is a representation showing a memory map of the whole system including various registers in the processor 10 in addition to the RAM 6 and the ROM 9. In the example of FIG. 2, the address numbers "0x0000_0000" to "0x01FF_FFFF" are assigned to the RAM 6, the address numbers "0xFE00_0000" to "0xFF00_0000" are assigned to various registers provided in the components (the command fetch control section 1, the command executing section 2, the cache unit 3, the bus control section 4, and the clock control section 5) in the processors 10, and the address numbers "0xFF00_0000" to "0xFFFF_FFFF" are assigned to the ROM 9. The address numbers "0x01FF_FFFF" to "0xFE00_0000" are unused.

In case of the example of FIG. 2, the area designation register 4a holds the address number "0x0000_0000" as information on the top address ASR, and the area size "01FF_FFFF" as information on the area size AMR. Thus the bus control section 4 requests data read to the RAM 6 with sending the request address add via an address line ram_add when the request address add received from the cache unit 3 is within the range of "0x0000_0000" to "0x01FF_FFFF".

When the request address add received is not within the range of "0x0000_0000" to "0x01FF_FFFF" defined by the combination of the top address ASR and the area size AMR in the area designation register 4a, and not within the range of "0FE00_0000" to "0xFF00_0000" assigned to the registers in the processor 10, the bus control section 4 requests data read to the ROM 9 with sending the request address add via the address bus 7.

The requested data in the RAM 6 or ROM 9 is read out from the corresponding memory, and sent to the bus control section 4 via a data line ram_data or the data bus 8. The bus control section 4 having received the data supplies the data as read data rdd to the cache unit 3. The cache unit 3 having received the read data rdd supplies the data as command data id to the command executing section 2. When necessary, the cache unit 3 registers the command data in the cache memory.

The command executing section 2 thus supplied with the command data id interprets and executes the command. If it is necessary in executing the command to refer to data stored in the RAM 6, the ROM 9, or a register in the processor 10, the command executing section 2 issues a data fetch request with a request data address oa to the cache unit 3.

The operation for the data fetch after this is substantially the same as that for the command fetch. But, if the request address add is within the range of "0xFE00_0000" to "0xFF00_0000" assigned to the registers in the processor 10, the bus control section 4 reads out the value of the corresponding register (the area designation register 4a, a reset register RSTR 4b as described later, or the like), and returns the read-out value as read data rdd to the cache unit 3. The data sent from the RAM 6, the ROM 9, or the register through the bus control unit 4 is finally supplied to the command executing section 2 as read data rd.

If it is necessary in executing the command to update the stored data of a memory such as the RAM 6 or a register, the command executing section 2 issues a data write request with a request data address oa and write data wd to the cache unit 3. When there is a cache hit, the cache memory writes the write data wd in the cache memory, and issues a data write request and write data wrd with a request address add to the bus control section 4.

The bus control section 4 having received the data write request requests data write to the RAM 6 with sending the request address add via the address line ram_add and the write data wrd via the data line ram_data when the request address add received is within the address area in the RAM 6 defined by the combination of the top address ASR and the area size AMR in the area designation register 4a. When the request address add received is within the address area of a register in the processor 10 such as the area designation register 4a or the reset register 4b, the bus control section 4 writes the write data wrd in the corresponding register to the request address add.

When the request address add received is not within the address area in the RAM 6 defined by the combination of the top address ASR and the area size AMR in the area designation register 4a, and not within the address area of any register in the processor 10, the bus control section 4 requests data write to the ROM 9 with sending the request address add via the address bus 7 and the write data wrd via the data bus 8.

The processor 10 of this embodiment is driven with the clock CLOCK externally given. The clock control section 5 generates the first and second internal clocks bck and cck based on the external clock CLOCK. The first internal clock bck is supplied to the bus control section 4, and the second internal clock cck is supplied to the remaining command fetch control section 1, command executing section 2, and cache unit 3.

A clock stop signal stop instructing the clock control section 5 to stop supplying the internal clock bck or cck is given to the clock control section 5 as occasion arises. That is, this processor 10 can stop the supply of its internal clock bck or cck by itself by its command executing section 2 executing a command for stopping the clock. Provided are two clock stop modes comprising the first mode of stopping both the internal clocks bck and cck, and the second mode of stopping only the second internal clock cck.

To restart the clock supply which has been stopped, the following two methods can be used. In the first method, either of an initial start reset signal PRST (a first reset signal according to the present invention) and a restart reset signal HRST (a second reset signal according to the present invention) is asserted. In the second method, a not-shown external bus master writes data in the reset register 4b provided in the bus control section 4, and a reset signal (start signal wup) corresponding to the above restart reset signal HRST or a program reset signal SRST, which will be described next, is generated in the bus control section 4 to assert. In case of the second method, since the bus control section 4 must be kept supplied with the first internal clock bck the above second mode is adopted.

Although the detail is not shown in FIG. 1, the above initial start reset signal PRST and restart reset signal HRST can be given to each component in the processor 10 (the command fetch control section 1, the command executing section 2, the cache unit 3, the bus control section 4, and the clock control section 5). In this embodiment, as well as these reset signals, provided is a program reset signal SRST (a third reset signal according to the present invention) for performing an reset operation independently of stop and restart of supply of the internal clock bck or cck. This program reset signal SRST is used in, e.g., debugging, and supplied only to the command fetch control section 1 and the command executing section 2.

Figure 3:
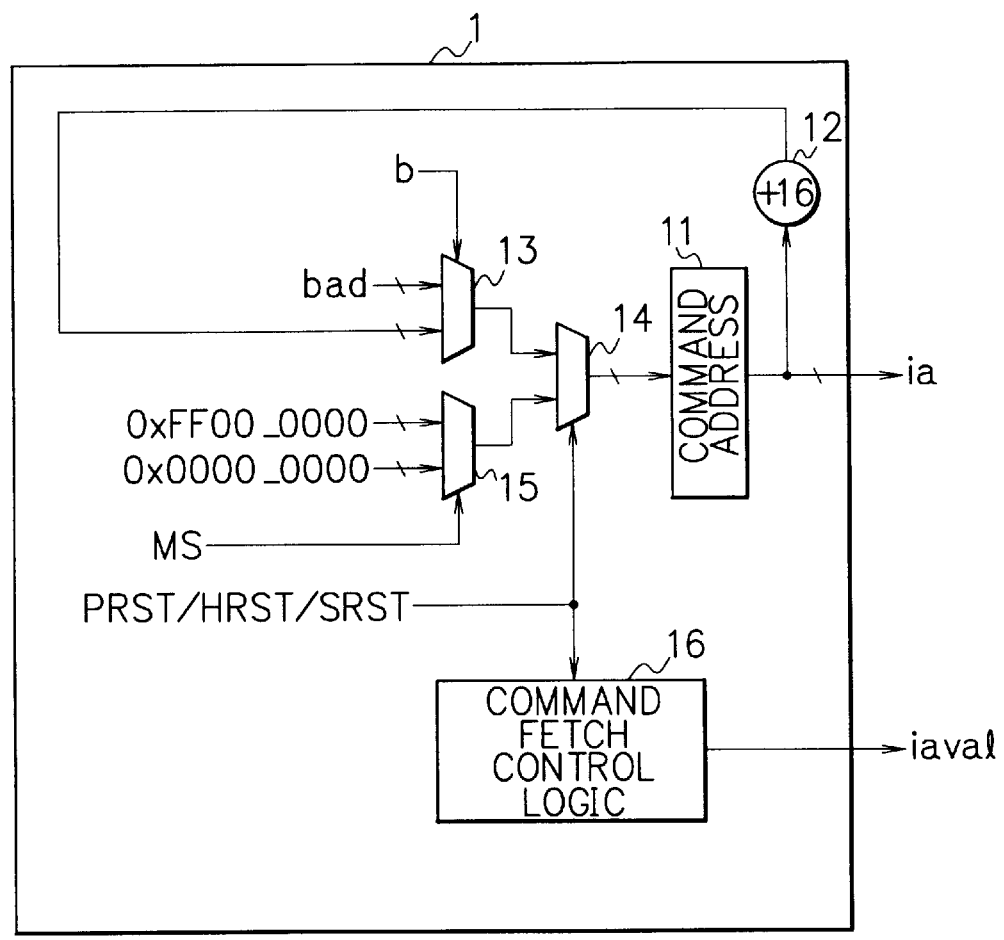
FIG. 3 is a block diagram showing the construction of the command fetch control section shown in FIG. 1.

FIG. 3 is a block diagram showing the construction of the command fetch control section 1. Referring to FIG. 3, a request command address ia is held in a command address register 11, and supplied to the cache unit 3. When the processor 10 executes commands in order, an adder 12 adds the value "16" to the address held in the command address register 11 at each time. The resultant address value is held in the command address register 11 when it is selected by selectors 13 and 14. The increment value "16" corresponds to the bus width of the command data bus of the processor 10.

When the processor 10 has executed a branch command, the command executing section 2 asserts a signal b indicating that a branch was made. In this case, as the next request command address ia, the selector 13 selects a branch destination address bad sent from the command executing section 2. The branch destination address bad is thereby sent through the selector 14 to the command address register 11, and held in the register 11.

When the processor 10 is being initialized with the initial start reset signal PRST, the restart reset signal HRST, the program reset signal SRST, or the start signal wup from the reset register 4b (hereinafter, each of these four signals will be generically and simply called reset signal), either address (0x0000_0000 or 0xFF00_0000) selected by a selector 15 in accordance with an address selection signal MS externally given, is further selected by the selector 14 in accordance with the above reset signal, and then held in the command address register 11.

For example, when the initial start reset signal PRST is input, i.e., the system is powered on, the address selection signal MS is set at "1", and one fixed value "0xFF00_0000" indicating the top address of the address area of the ROM 9 is selected and held in the command address register 11. Contrastingly, when the restart reset signal HRST is input, i.e., the supply of the internal clock bck or cck is restarted in the state that the clock has been stopped, the address selection signal MS is set at "0", and the other fixed value "0x0000_0000" indicating the top address of the address area of the RAM 6 is selected and held in the command address register 11.

When the program reset signal SRST or the start signal wup is input, the operation is the same as that in case of the restart reset signal HRST.

In this manner, the request command address in fetching the first command of an initialization program when a reset signal is negated, is either of the top address "0xFF00_0000" of the ROM 9 and the top address "0x0000_0000" of the RAM 6. Thus the selectors 14 and 15 which perform selecting operations in accordance with the address selection signal MS, comprises an address selecting section according to the present invention.

In response to a reset signal given, a command fetch control logic circuit 16 determines as to whether a command fetch request iaval should be issued or not, in accordance with the state of the processor 10 executing commands, the state of the control section of the cache unit 3, etc. The request command address ia held in the command address register 11 is never renewed unless a command fetch request iaval is asserted to the cache unit 3, and the cache unit 3 accepts the assertion.

Figure 4:
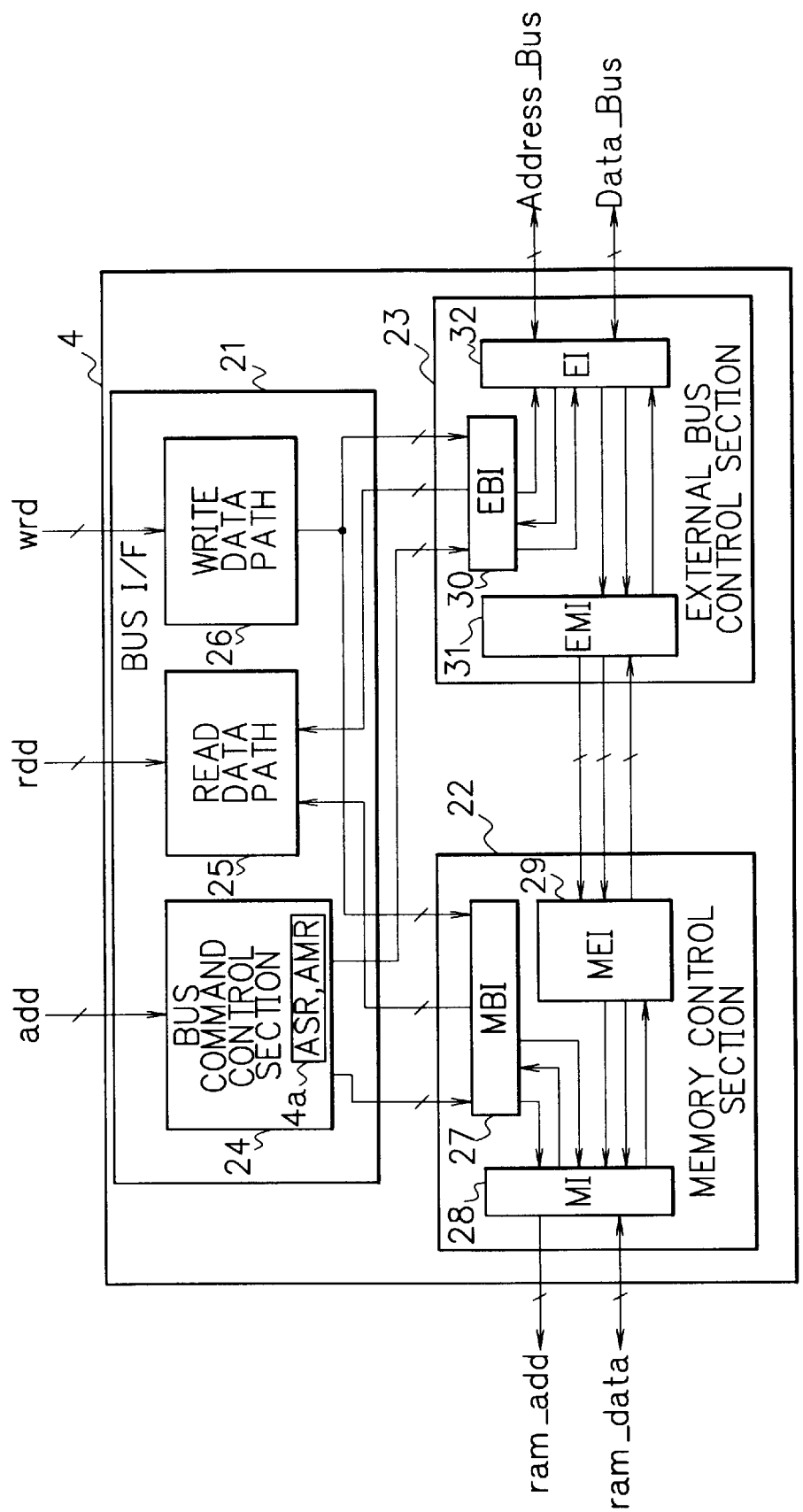
FIG. 4 is a block diagram showing the construction of a portion of the bus control section shown in FIG. 1 including an area designation register, wherein flows of addresses and data are also shown.

FIG. 4 is a block diagram showing the construction of a portion of the bus control section 4 including the area designation register 4a. FIG. 4 also shows flows of addresses and data. Referring to FIG. 4, the bus control section 4 comprises a bus I/F 21, a memory control section 22, and an external bus control section 23. The bus I/F 21 comprises a bus command control section 24 including the above area designation register 4a, a read data path 25, and a write data path 26.

The memory control section 22 comprises a memory-bus I/F (MBI) 27, a memory I/F (MI) 28, and a memory-external bus I/F (MEI) 29. The external bus control section 23 comprises an external bus-bus I/F (EBI) 30, an external bus-memory I/F (EMI) 31, and an external bus I/F 32.

The operation of the bus control section 4 in fetching a command will be described below. When the bus control section 4 receives a command fetch request from the cache unit 3, the bus command control section 24 compares the request address add attendant upon the command fetch request, with the top address ASR and the value of the area size AMR registered in the area designation register 4a to judge as to whether or not the request address add is within the address area of the RAM 6.

When the comparison result indicates that the command fetch request is directed to the RAM 6, the bus command control section 24 issues a command fetch request to the memory control section 22. The memory control section 22 having received the command fetch request through the memory-bus I/F 27, accesses the RAM 6 connected through the memory I/F 28, and reads out the command data corresponding to the request address add. The read-out command data is sent through the memory-bus I/F 27 and the read data path 25 to the cache unit 3, and finally to the command executing section 2.

When the above comparison result indicates that the command fetch request is directed to the ROM 9 connected to the external buses 7 and 8, the bus command control section 24 issues a command fetch request to the external bus control section 23. The external bus control section 23 having received the command fetch request through the external bus-bus I/F 30, makes bus arbitration, and issues memory transaction onto the external buses 7 and 8, and waits for a response to it.

When command data read out from the ROM 9 connected to the external buses 7 and 8, is output onto the external buses 7 and 8, the external bus control section 23 takes the command data in through the external bus I/F 32. The thus taken-in command data is sent through the external bus-bus I/F 30 and the read data path 25 to the cache unit 3, and finally to the command executing section 2.

Figure 5:
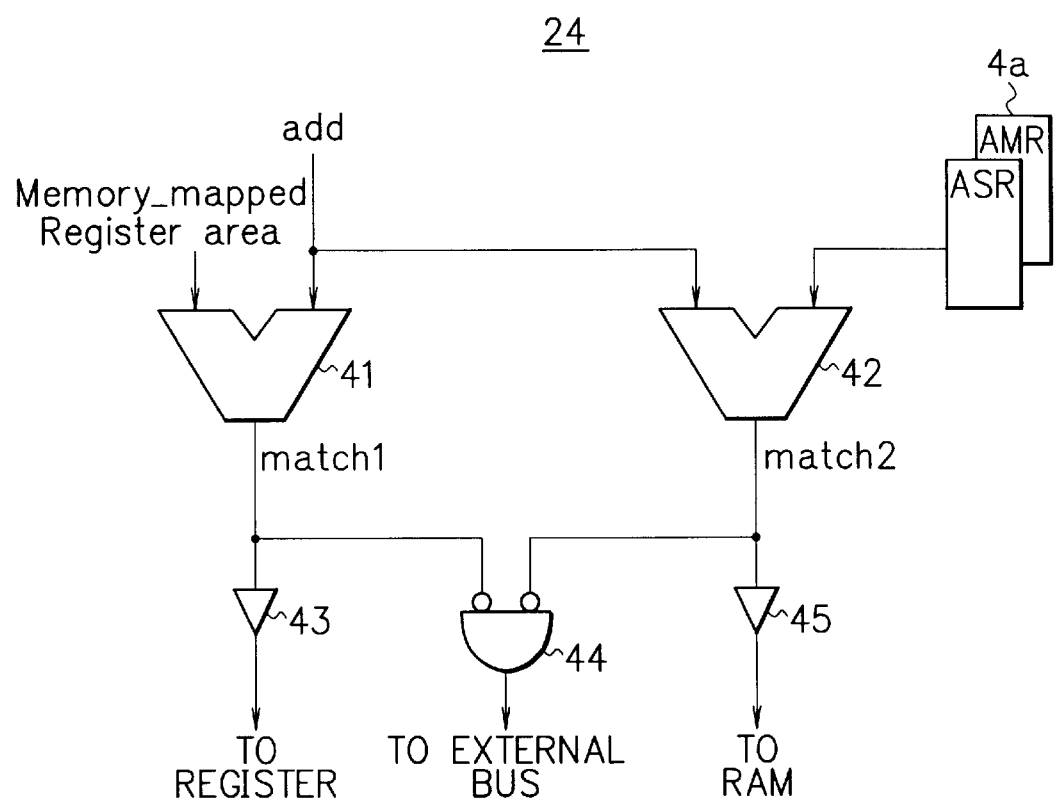
FIG. 5 is a block diagram showing the construction of a portion of the bus command control section shown in FIG. 4 which performs address judgement.

FIG. 5 is a block diagram showing the construction of a portion of the bus command control section 24 shown in FIG. 4 which performs address judgement. Referring to FIG. 5, the bus command control section 24 comprises the above-described area designation register 4a, two comparators 41 and 42, two buffers 43 and 45, and a NAND gate 44.

One comparator 41 compares the request address add given by the cache unit 3, with the address areas of the registers in the memory map shown in FIG. 2. When the comparison result indicates that the request address add is within the address areas of the registers (when a signal match1 is asserted), the bus command control section 24 issues a command fetch request to the corresponding one of the registers through the buffer 43.

The other comparator 42 compares the request address add given by the cache unit 3, with the address area of the RAM 6 defined by the combination of the top address ASR and the area size AMR in the area designation register 4a. When the comparison result indicates that the request address add is within the address area of the RAM 6 (when a signal match2 is asserted), the bus command control section 24 issues a command fetch request to the RAM 6 through the buffer 45.

When the comparison results of the comparators 41 and 42 indicate that the request address add is within neither of the address areas of the registers and the address area of the RAM 6 (when neither of the signals match1 and match2 is asserted), the bus command control section 24 issues a command fetch request onto the external buses 7 and 8 through the NAND gate 44.

Figure 6:
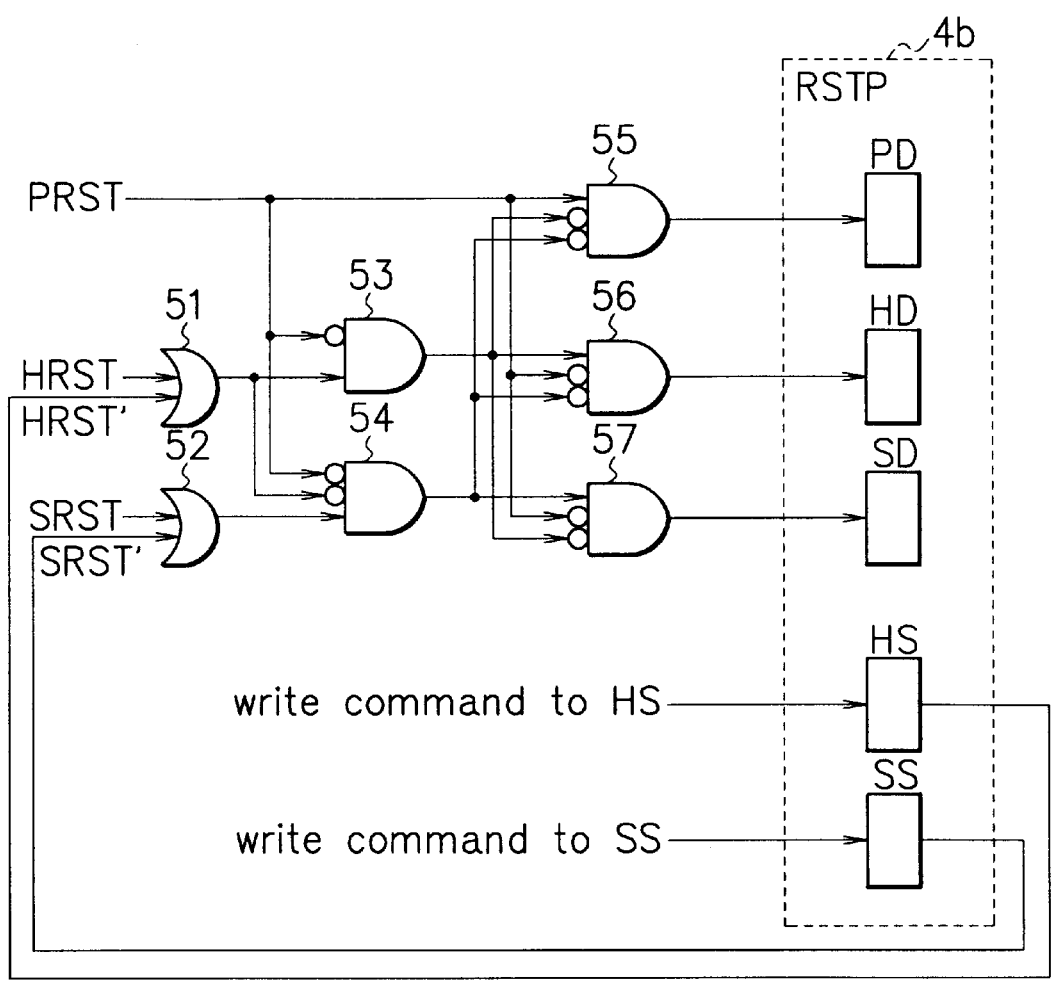
FIG. 6 is a block diagram showing the construction of a portion of the bus control section including a reset register, wherein flows in data write to the reset register are also shown.

FIG. 6 is a block diagram showing the construction of a portion of the bus control section 4 including the reset register 4b. FIG. 6 also shows flows in data write to the reset register 4b. Referring to FIG. 6, the reset register 4b comprises five register components respectively corresponding to five bits PD, HD, SD, HS, and SS.

The PD, HD, and SD bits are for indicating reset causes just before. The PD bit indicates initial start reset when powered on, the HD bit indicates restart reset when restarting clock supply, and the SD bit indicates program restart reset when debugging or the like. These three bits correspond to an information holding section according to the present invention for holding information for distinguishing among the respective reset causes.

The remaining HS and SS bits are for generating reset signals (HRST' and SRST') corresponding to the restart reset signal HRST and the program reset signal SRST, in the bus control section 4 by the manner that a not-shown bus master writes data in the HS and SS bits, respectively. The register components corresponding to these two bits comprise a reset internally-generating section according to the present invention. The outputs of the HS and SS bits are supplied together with the restart reset signal HRST and the program reset signal SRST to OR gates 51 and 52, respectively. Effective one of them is then supplied to the subsequent stage.

Several logic gates 51 to 57 are properly disposed between the group of the bits PD, HD, and SD in the reset register 4b, and the group of the initial start reset signal PRST, the restart reset signal HRST, and the program reset signal SRST, such that only one of the bits PD, HD, and SD is set at "1".

More specifically, when the initial start reset signal PRST is asserted, the PD bit is set at "1". When the external restart reset signal HRST is asserted, or the internal restart reset signal HRST' is asserted by writing data in the HS bit, the HD bit is set at "1". When the external program reset signal SRST is asserted, or the internal program reset signal SRST' is asserted by writing data in the SS bit, the SD bit is set at "1".

The proper arrangement of the logic gates 51 to 57 gives the priority of PRST>HRST>SRST to the above three reset operations. The reset causes just before are respectively kept in the PD, HD, and SD bits unless a new reset cause arises.

Figure 7:
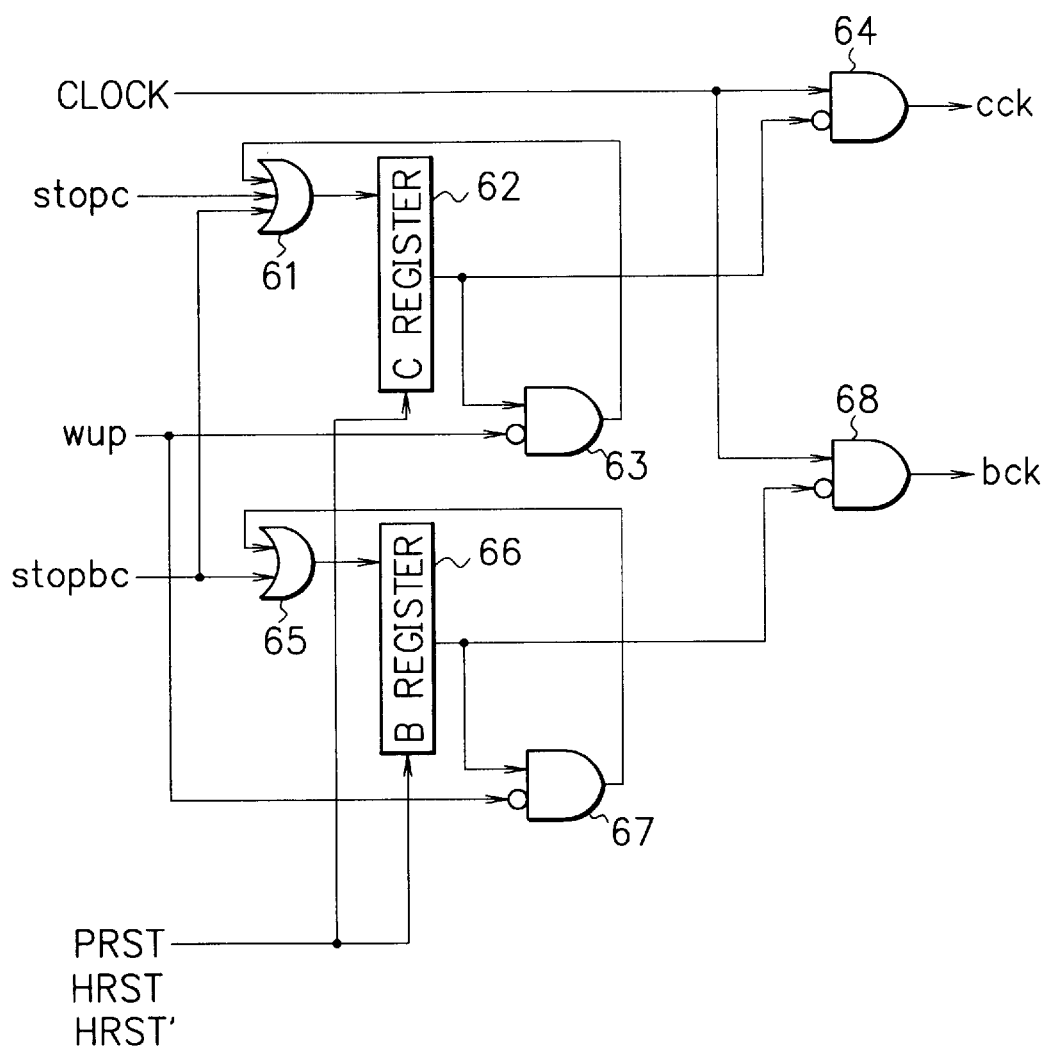
FIG. 7 is a block diagram showing the construction of the clock control section shown in FIG. 1.

FIG. 7 is a block diagram showing the construction of the clock control section 5 shown in FIG. 1. The clock control section 5 generates two internal clocks bck and cck based on a clock CLOCK externally given, and supplies them in the processor 10. In this embodiment, the bus control section 4 and the other components are supplied with their internal clocks through separate lines bck and cck, as shown in FIG. 1.

Besides, in this embodiment, a clock supply in the processor 10 can be temporarily stopped according to instructions from the command executing section 2. For example, in order to reduce the power consumption of the system, when an idle state of the processor 10 continues for a certain time, the command executing section 2 asserts a clock stop signal stop to the clock control section 5.

In this case, selectable is either of the first mode of stopping both the internal clocks bck and cck for the whole of the processor 10 including the bus control section 4, and the second mode of stopping only the second internal clock cck for the components other than the bus control section 4 in the processor 10. In accordance with the selected mode, the command executing section 2 asserts a clock stop signal stopbc or stopc.

The clock stop signal stopbc for stopping the whole of the processor 10 is supplied to two OR gates 61 and 65. The clock stop signal stopbc having passed through one OR gate 61 is held in a C register 62, and then supplied to the negative logic terminal of an AND gate 64. The AND gate 64 performs AND operation between the clock stop signal stopbc and the external clock CLOCK supplied through its positive logic terminal, and outputs the internal clock cck in accordance with the operation result.

The clock stop signal stopbc having passed through the other OR gate 65 is held in a B register 66, and then supplied to the negative logic terminal of an AND gate 68. The AND gate 68 performs AND operation between the clock stop signal stopbc and the external clock CLOCK supplied through its positive logic terminal, and outputs the internal clock bck in accordance with the operation result.

In this arrangement, when the clock stop signal stopbc is asserted, either of the AND gates 64 and 68 receives a signal "1" through its negative logic terminal. As a result, both the internal clocks bck and cck are stopped.

Contrastingly, the clock stop signal stopc for stopping the components other than the bus control section 4 in the processor 10, is supplied only to the OR gate 61. The clock stop signal stopc having passed through the OR gate 61 is held in the C register 62, and then supplied to the negative logic terminal of the AND gate 64. The AND gate 64 performs AND operation between the clock stop signal stopc and the external clock CLOCK supplied through its positive logic terminal, and outputs the internal clock cck in accordance with the operation result.

In this arrangement, when the clock stop signal stopc is asserted, the AND gate 64 receives a signal "1" through its negative logic terminal. As a result, the internal clock cck is stopped. But, since the clock stop signal stopc is not supplied to the OR gate 65, the AND gate 68 does not receive any signal "1" through its negative logic terminal even when the clock stop signal stopc is asserted. Thus the internal clock bck is not stopped.

The above OR gates 61 and 65 are also supplied with outputs of AND gates 63 and 67, respectively. The AND gate 63 receives the output of the C register 62 through its positive logic terminal, and the start signal wup through its negative logic terminal, and performs AND operation between them to supply the resultant signal to the OR gate 61. The AND gate 67 receives the output of the B register 66 through its positive logic terminal, and the start signal wup through its negative logic terminal, and performs AND operation between them to supply the resultant signal to the OR gate 65.

The stored data of each of the C and B registers 62 and 66 is renewed by asserting the initial start reset signal PRST, the restart reset signal HRST, or the internal restart reset signal HRST' generated by an external bus master or the like writing data in the reset register 4b (HS bit shown in FIG. 6).

For example, in the state that only the bus control section 4 is supplied with the internal clock bck the supply of the internal clock cck to the components other than the bus control section 4 can be restarted by asserting the internal restart reset signal HRST'. In the state that the whole of the processor 10 is not supplied with the internal clocks bck and cck, the supplies of the internal clocks bck and cck can be restarted by asserting the initial start reset signal PRST or the restart reset signal HRST.

Next, sequences of start processing in case of solely using the processor 10 according to this embodiment will be described.

A sequence of start processing with the initial start reset signal PRST when the system is powered on, will be described first.

When the system is powered on, the initial start reset signal PRST is asserted to perform the hardware initialization. By this initialization, the values of all registers in the processor 10 including the area designation register 4a and the reset register 4b in the bus control section 4, are initialized to, e. g., "0".

After the initial start reset signal PRST is asserted for a time necessary and sufficient for the hardware initialization, and the power supply becomes stable, the initial start reset signal PRST is negated. When the initial start reset signal PRST is negated, initialization programs for the subsequent software initialization are read out from addresses designated by a reset vector.

Since the RAM 6 does not store the data of effective initialization programs immediately after the system is powered on, the value of the address selection signal MS is set at "1". Thus the command fetch control section 1 issues a command fetch request for the initial address "0xFF00_0000".

In response to this, the bus control section 4 judges as to whether or not the given request address add of "0xFF00_0000" is within the address area of the RAM 6 defined by the top address ASR and the area size AMR in the area designation register 4a. In accordance with the judgement result, the bus control section 4 can access either of the RAM 6 and the ROM 9. At this time, however, since the address area of the RAM 6 has been initialized into "φ", and the given request address add is directed to the address area of the ROM 9, the bus control section 4 accesses the ROM 9 connected to the external buses 7 and 8.

The initialization program stored in the ROM 9 is so made that its first sequence gives instructions to refer to the reset register 4b. Immediately after the system is powered on, the processor 10 recognizes that the PD bit in the reset register 4b has been set at "1", and the processor 10 executes a routine including processes which will become necessary when the initial start reset signal PRST is negated.

After the processor 10 is started thus, address data necessary for accessing the RAM 6 (the top address ASR and the area size AMR) is set in the area designation register 4a. In the example of FIG. 2, "0x0000_0000" and "0x01FF_FFFF" are respectively set as the top address ASR and the area size AMR, so that the address area of 32 megabytes is prepared in the RAM 6. After the necessary data is set in the area designation register 4a, the value of the address selection signal MS is changed into "0", and programs for restart operations are loaded in the RAM 6 from the ROM 9 or other devices connected to the external buses 7 and 8.

Next, a sequence of start processing with the restart reset signal HRST when the supplies of the internal clocks are restarted, will be described.

As an example, here will be described the case that the supplies of the internal clocks bck and cck for the whole of the processor 10 are stopped because a necessary process has not been performed for a certain time after the processor 10 is started, and a sequence of restart processing for restarting the processor 10 is executed with the external restart reset signal HRST when the processor 10 is required to operate.

When the external restart reset signal HRST is asserted, the registers in the clock control section 5 which cause the stop of the supplies of the internal clocks bck and cck (C and B registers 62 and 66 shown in FIG. 7) are reset, and thereby the supplies of the internal clocks bck and cck are restarted. The hardware initialization is then performed except processing in relation to information necessary for memory access (e.g., the top address ASR and the area size AMR in the area designation register 4a).

In case of using an SDRAM as a local memory connected to the processor 10, the processor 10 may comprise various registers for storing data necessary for memory access, other than the area designation register 4a for storing the top address ASR and the area size AMR. Such registers may include a control register for setting the minimum cycle number of the operation of the DRAM which varies in accordance with the kind of DRAM; an access mode control register for setting an access mode to the DRAM; mode set registers for setting data to be written in the DRAM when the mode of the DRAM is set; configuration registers for setting data such as type, bus width, and connection manner, i.e., direct connection or connection using DIMM, of the DRAM; address number registers for setting the number of bits of RAS address, the number of bits of CAS address, and the number of bits of bank address of the DRAM; a status register for indicating a state of the controller of the DRAM; a refresh control register for setting auto refresh or self refresh of the DRAM; and a refresh timer register for setting a refresh interval in auto refresh. Any of these registers is initialized by the initial start reset signal PRST, but not initialized by the restart reset signal HRST or the program reset signal SRST.

When the restart reset signal HRST is negated after the above hardware initialization, command fetch is started from the address "0x0000_0000" selected by the address selection signal MS (="0"). Since the top address ASR and the area size AMR in the area designation register 4a are not initialized by assertion of the restart reset signal HRST, the command fetch requests of this time are issued to the RAM 6. As a result, since access to the low-speed ROM 9 is not required, restart processing for the processor 10 can be performed rapidly.

In this restart operation, it is also possible to instruct the processor 10 to issue command fetch requests to the ROM 9 by setting the address selection signal MS at "1". In case that command fetch from the ROM 9 is executed when the processor 10 is restarted, in the first sequence of the initialization program stored in the ROM 9, the reset register 4b is referred to, and it is recognized that the HD bit in the reset register 4b has been set. This makes it possible to omit processing for newly setting data in the area designation register 4a which was already set when the system was powered on. Accordingly, restart processing for the processor 10 can be performed more rapidly.

The same operation as the above is performed in the restart sequence in case of restarting the processor 10 with the external restart reset signal HRST' after stopping the supply of only the internal clock cck, or in case of restarting the processor 10 with the internally-generated restart reset signal HRST' after stopping the supplies of both the internal clocks bck and cck, or the supply of only the internal clock cck.

Next, a sequence of start processing with the program reset signal SRST will be described.

When the external program reset signal SRST is asserted, the program which is being executed by the command executing section 2, is forcibly interrupted, and the hardware initialization of the command fetch section 1 is performed.

After this, when the program reset signal SRST is negated, command fetch is started from the address "0x0000_0000" selected by the address selection signal MS (="0"). Since the top address ASR and the area size AMR in the area designation register 4a are not initialized by assertion of the program reset signal SRST, the command fetch requests of this time are issued to the RAM 6. As a result, since access to the low-speed ROM 9 is not required, restart processing for the processor 10 can be performed rapidly.

In this restart operation, it is also possible to instruct the processor 10 to issue command fetch requests to the ROM 9 by setting the address selection signal MS at "1". In case that command fetch from the ROM 9 is executed in this program reset operation, in the first sequence of the initialization program stored in the ROM 9, the reset register 4b is referred to, and it is recognized that the SD bit in the reset register 4b has been set. This makes it possible to perform processing for newly setting data only in the registers of the command fetch control section 1, and omit the other processes unnecessary. Accordingly, restart processing for the processor 10 can be performed more rapidly.

As described above in detail, in the processor 10 according to this embodiment, when the software initialization is performed, a starting operation based on the ROM 9 connected to the external buses 7 and 8, and a starting operation based on the RAM 6 connected as a local memory to the processor 10 can be selected in accordance with instructions with the address selection signal MS and one of the initial start reset signal PRST, the restart reset signal HRST, and the program reset signal SRST.

By this manner, in the state that the supplies of the internal clocks bck and cck or the supply of the internal clock cck is stopped after the system is powered on, the processor 10 can be restarted by reading out an initialization program for restarting, from the high-speed RAM 6. Therefore, the restarting process can be performed rapidly. Besides, even in case of accessing the ROM 9 when restarting, by reading the value of the reset register 4b, the initialization program stored in the ROM 9 can be branched so as selectively to execute only processing in accordance with the reset cause. As a result, even in a system in which clock supply in the processor 10 is frequently stopped and restarted for reducing power consumption, the vain time for waiting for the start of the system can be shortened considerably.

Besides, in case of a multiprocessor system in which the same processors as the above processor 10 are connected to a common bus, when, e.g., a slave processor in which the supplies of its internal clocks bck and cck or the supply of one internal clock cck has been temporarily stopped, is to be restarted, the slave processor can read out an initialization program for restarting, from the high-speed RAM 6, and so the restarting process can be performed rapidly. Besides, since each slave processor never issues any command fetch request onto the external buses 7 and 8, there is no case that accesses from processors to the ROM 9 concur. Thus processing for bus arbitration becomes unnecessary.

Further, in such a multiprocessor system as described above, the top address of the memory storing the initialization program which each processor is to execute, is selected by the address selection signal MS. Therefore, means for judging as to which of the programs stored in the ROM 9 each processor is to execute, becomes unnecessary. As a result, the system construction can be simplified.

Next, a data processing system according to the second embodiment of the present invention will be described.

Figure 8:
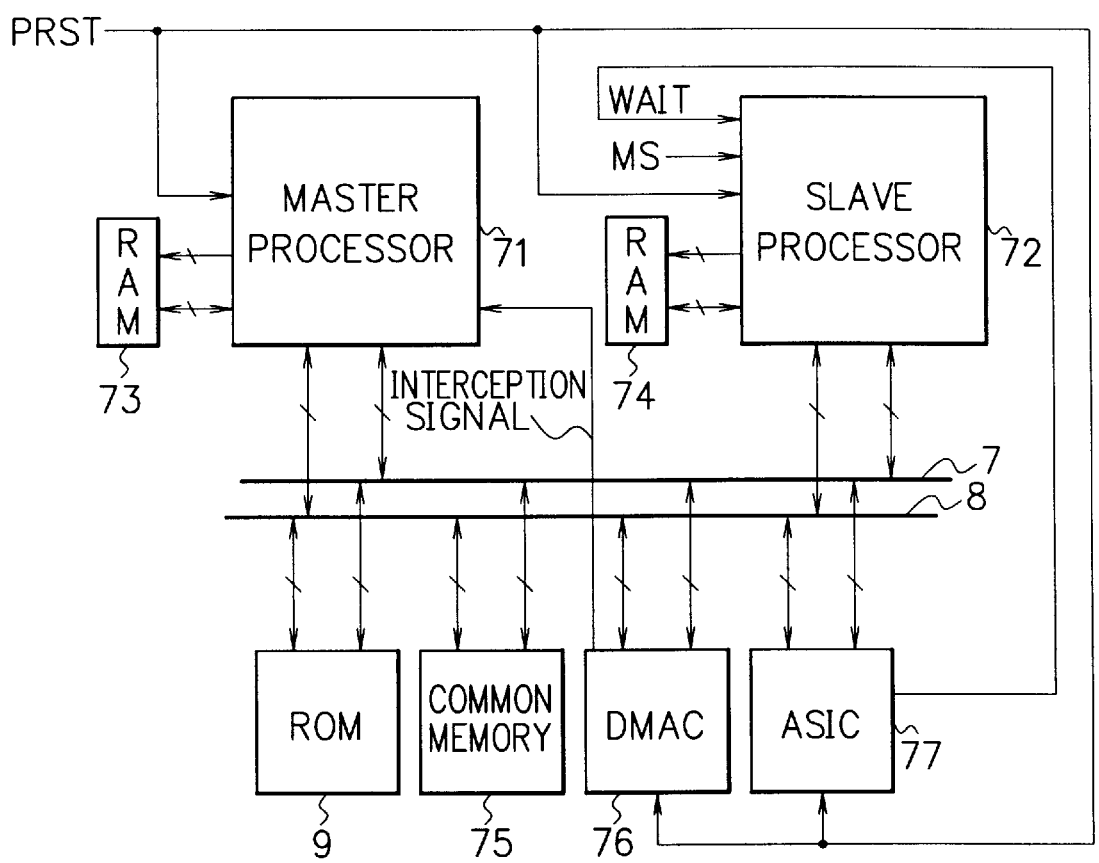
FIG. 8 is a block diagram showing the construction of a multiprocessor system including a processor as a slave processor according to the second embodiment of the present invention.

FIG. 8 is a block diagram showing the construction of a multiprocessor system including a processor as a slave processor according to the second embodiment.

Referring to FIG. 8, the system comprises a master processor 71 and a slave processor 72. RAMs 73 and 74 are connected to the master and slave processors 71 and 72 as their local memories, respectively. To external buses 7 and 8 as common buses, as well as the master and slave processors 71 and 72, connected are a ROM 9, a common memory 75, a DMAC (Direct Memory Access Controller) 76 for direct data transference between memories, and an ASIC (Application Specific Integrated Circuit) 77 for generating control signals for the slave processor 72.

The master processor 71 always operates after the system is powered on. Any usual processor can be used as the master processor 71. Contrastingly, after the system is powered on, the slave processor 72 can be stopped and restarted for the purpose of reducing power consumption, by stopping and restarting its internal clock supply. As the slave processor 72, used is a specific processor according to this embodiment.

Figure 9:
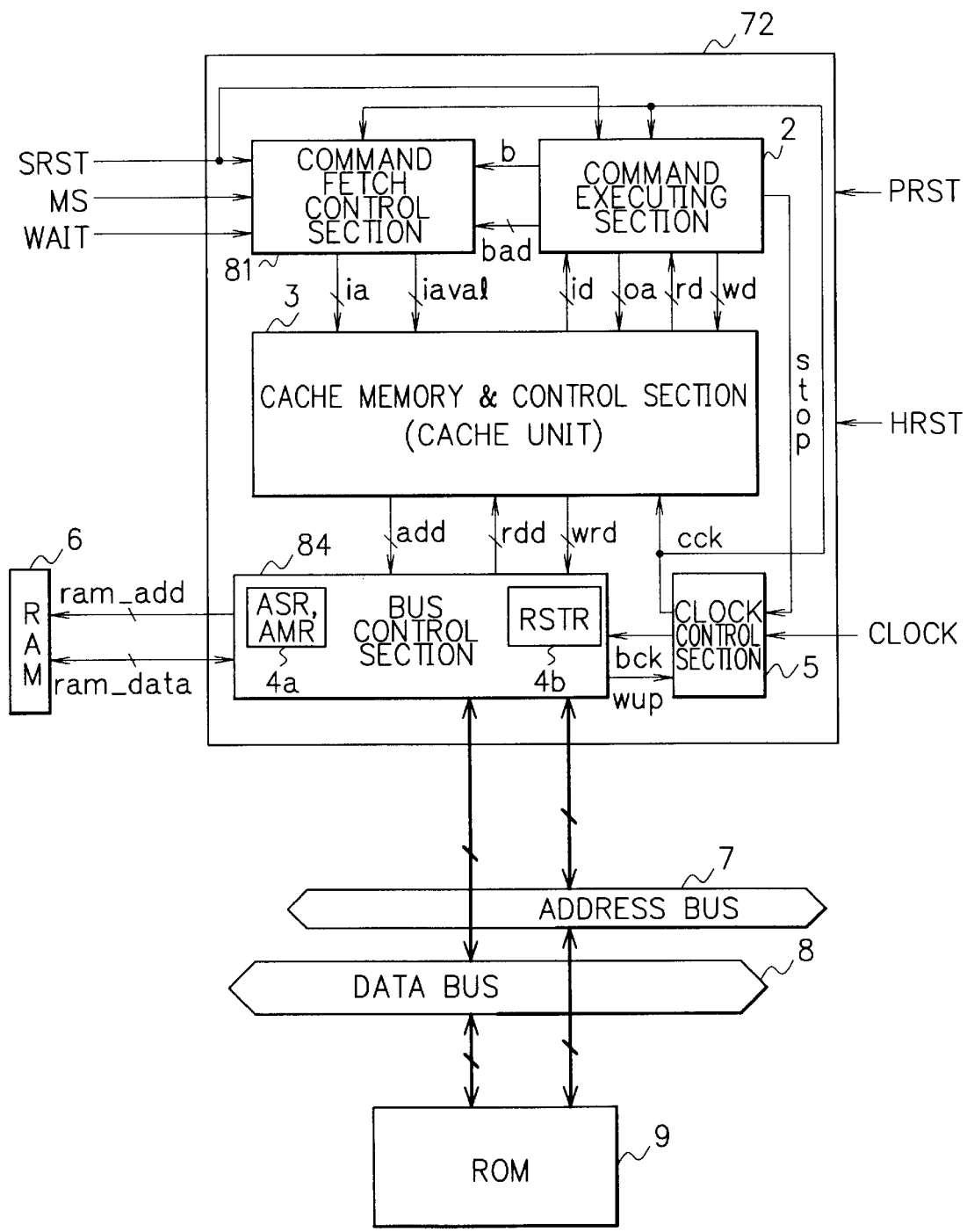
FIG. 9 is a block diagram showing the construction of the slave processor according to the second embodiment.

FIG. 9 is a block diagram showing the construction of the slave processor 72 according to this embodiment.

The slave processor 72 according to this embodiment has almost the same construction as the processor 10 shown in FIG. 1. But, a command fetch control section 81 and a bus control section 84 of the slave processor 72 differ in construction from the corresponding ones in FIG. 1, respectively. Besides, to the command fetch control section 81, a start inhibiting signal WAIT is input as well as a program reset signal SRST and an address selection signal MS.

Figure 10:
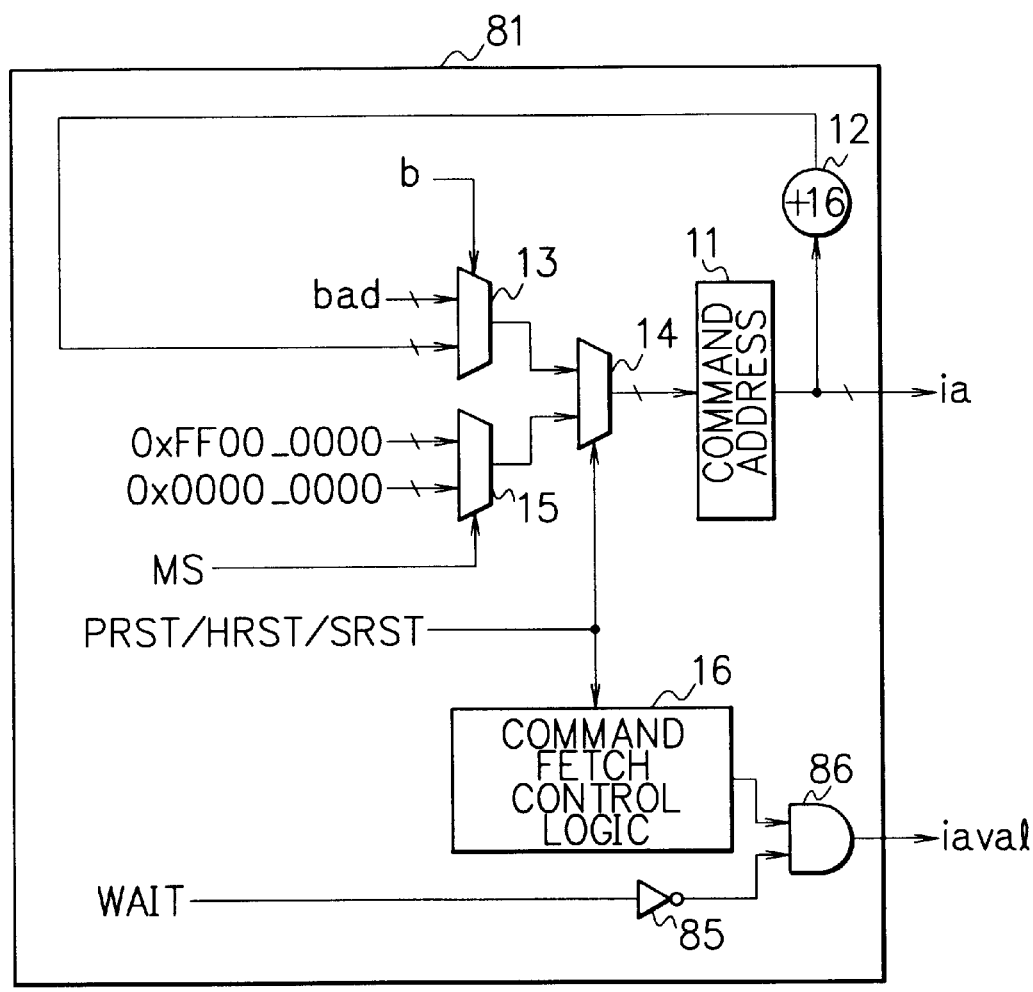
FIG. 10 is a block diagram showing the construction of a command fetch control section according to second embodiment.

FIG. 10 is a block diagram showing the construction of the command fetch control section 81. Referring to FIG. 10, in the command fetch control section 81 of this embodiment, an inverter 85 for inverting the logic of the start inhibiting signal WAIT, and an AND gate 86 for performing AND operation between the output of the inverter 85 and the output of the command fetch control logic circuit 16, are added to the construction of the command fetch control section 1 shown in FIG. 3.

By this construction, even when the command fetch control logic circuit 16 is in the state that it can issue a command fetch request iaval, as a result of judgement of conditions of command execution by the processor 72, conditions of the cache control section, etc., the command fetch request iaval is not issued to the cache unit 3 unless an external start inhibiting signal WAIT is negated. The inverter 85 and the AND gate 86 comprise a start inhibiting section according to the present invention.

The bus control section 84 has almost the same construction as the bus control section 4 shown in FIG. 4. But, when a transaction generated on the external buses 7 and 8 in accordance with a defined protocol, is a request from another device to the external bus control section 23 of this embodiment, the external bus control section 23 takes the command in and starts the corresponding process.

More specifically, the external bus control section 23 always monitors transactions generated on the external buses 7 and 8. When there is an effective transaction, the external bus control section 23 takes the address data in and compares it with the address data which has been assigned to the components in the processor. When the comparison result indicates that the transaction is a request to a component in the processor, the external bus control section 23 takes in the command of the transaction and starts to access the component designated by the address data.

Figure 11:
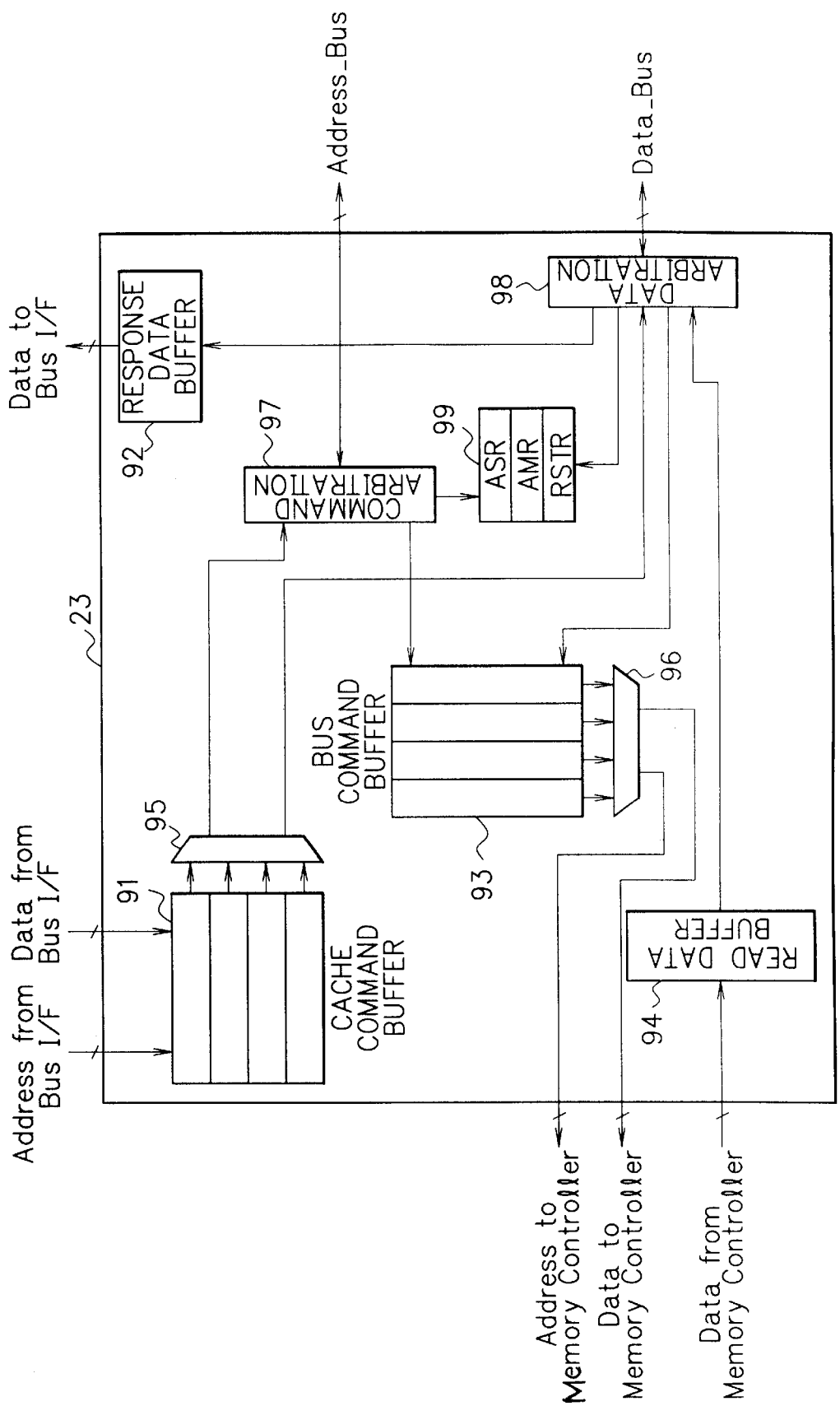
FIG. 11 is a block diagram showing the construction of an external bus control section according to the second embodiment.

FIG. 11 is a block diagram showing the construction of the external bus control section 23. Referring to FIG. 11, the external bus control section 23 of this embodiment comprises a four-stage cache command buffer 91 for holding commands and write data from the cache unit 3, a response data buffer 92 for sending out response data received from the external buses 7 and 8, to the cache unit 3, a four-stage bus command buffer 93 for holding commands and write data from the external buses 7 and 8, and a read data buffer 94 for receiving read-out data from the RAM 74 as a local memory.

The external bus control section 23 further comprises a selector 95 for selecting one of the data units stored in the four-stage cache command buffer 91, a selector 96 for selecting one of the data units stored in the four-stage cache command buffer 93, a command arbitrating section 97 for arbitrating on the address bus 7, a command arbitrating section 98 for arbitrating on the data bus 8, and registers 99 developed on a memory map.

The registers 99 correspond to the area designation register 4a and the reset register 4b shown in FIG. 9. More specifically, the registers 99 are to hold data of the top address ASR and the area size AMR of the RAM 74, reset cause specifying data PD, HD, and SD, and internal reset write data HS and SS. The registers 99 can be accessed by either of a command from the cache unit 3 and a command from the external buses 7 and 8.

In the first embodiment described before, the area designation register 4a for storing the top address ASR and the area size AMR is provided in the bus I/F 21 (see FIG. 4). Contrastingly in this second embodiment, the registers 99 for storing the corresponding data are provided in the external bus control section 23. In this second embodiment, the bus I/F 21 receives the data set in the registers 99, from the external bus control section 23.

Next, sequences of start processing in the multiprocessor system in which the processor 72 according to this embodiment is used as a slave processor, will be described.

A sequence of start processing with the initial start reset signal PRST when the system is powered on, will be described first.

When the system is powered on, the initial start reset signal PRST is asserted to the master processor 71, and the initial start reset signal PRST and the start inhibiting signal WAIT are asserted to the slave processor 72. When the initial start reset signal PRST is asserted, hardware initialization is performed in either of the master and slave processors 71 and 72. The values of the registers in the processors 71 and 72 including the data of the top address ASR and the area size AMR, are thereby initialized to, e.g., "0".

After the hardware initialization is completed and the power supply becomes stable, the initial start reset signal PRST is negated. When the initial start reset signal PRST is negated, the master processor 71 reads out initialization programs for the subsequent software initialization from the ROM 9 connected to the external buses 7 and 8, in accordance with addresses designated by a reset vector. At this time, since the start inhibiting signal WAIT is kept asserted, the slave processor 72 issues no command fetch request iaval and reads out no initialization program.

When the software initialization is completed in the master processor 71, the master processor 71 sets the data in the slave processor 72 (such as the data of the top address ASR and the area size AMR) at proper values through the external buses 7 and 8. More specifically, the master processor 71 writes data in the registers 99 through a data arbitrating section 98 shown in FIG. 11, to set a proper address area of the RAM 74 connected to the slave processor 71. The master processor 71 then starts the DMAC 76 to transfer the initialization programs which will be required by the slave processor 72, from, e.g., the ROM 9 to the RAM 74.

At this time, the external bus control section 23 provided in the slave processor 72 shown in FIG. 11, judges as to whether or not the address given through the address bus 7 by the DMAC 76 for data direct transference between memories, is within the address area of the RAM 74 defined by the combination of the top address ASR and the area size AMR set in the registers 99.

In this case, since the data of the top address ASR and the area size AMR in the registers 99 has been set to define the address area of the RAM 74, the external bus control section 23 transfers the data of each initialization program sent from the ROM 9 via the data bus 8, to the memory control section 22. Each initialization program is then stored in the corresponding address area of the RAM 74.

In this embodiment, since the data of the top address ASR and the area size AMR is held not in the bus I/F 21 but in the external bus control section 23, transference of initialization programs can be performed only by the memory control section 22 and the external bus control section 23 without using the bus I/F 21. Besides, since the DMAC 76 can perform transference processing independently of the master processor 71, transference processing for necessary software to the RAM 74 for the slave processor 72, can be performed without using the processing part of the master processor 71.

The DMAC 76 informs the master processor 71 of completion of transference processing, by an interception signal. After this, the master processor 71 which had received the interception signal, accesses the ASIC 77 when necessary, to negate the start inhibiting signal WAIT. In response to the negation of the start inhibiting signal WAIT, the command fetch control section 81 of the slave processor 72 issues a command fetch request iaval from the initial address "0x0000_0000" selected in accordance with the address selection signal MS to which "0" has been set, to the bus control section 84 through the cache unit 3.

The bus command control section 24 in the bus control section 84 compares a request address add attendant upon the command fetch request iaval, with the values of the top address ASR and the area size AMR received from the registers 99 in the external bus control section 23. In accordance with the comparison result, the bus command control section 24 judges as to whether or not the request address add is within the address area of the RAM 74.

At this time, since the data of the top address ASR and the area size AMR has been set to define the address area of the RAM 74, the bus command control section 24 judges that the command fetch request iaval is directed to the RAM 74, and the bus command control section 24 issues a command fetch request to the memory control section 22. The memory control section 22 having received the command fetch request, accesses the RAM 74 connected through the memory I/F 28, to read out the command data corresponding to the request address add. The read-out command data is supplied to the command executing section 2, and executed.

After this, if a necessary process is not performed in the slave processor 72 for a certain time, in response to this, the command executing section 2 of the slave processor 72 gives the clock control section 5 a clock stop signal stopc. The supply of the internal clock cck which has been supplied to the components other than the bus control section 84 in the slave processor 72, is thereby stopped.

When necessary, the master processor 71 makes the slave processor 72 start the supply of the internal clock cck, by writing data in the HS bit of the registers 99 of the slave processor 72. The hardware and software initializations are thereby performed in the slave processor 72. In this case, the sequence of start processing for initialization programs necessary for the software initialization is the same as that described in the first embodiment. Executed is a high-speed restart operation from the RAM 74.

As described above, according to this second embodiment, in the sequence of start processing with the initial start reset signal PRST when the system is powered on, initialization programs are transferred to the RAM 74 while the slave processor 72 is inhibited from issuing any command fetch request iaval, by the assertion of the start inhibiting signal WAIT. After this, the start inhibiting signal WAIT is negated so that the slave processor 72 can issue command fetch requests iaval to the RAM 74.

Therefore, in the sequence of start processing when the system is powered on, the slave processor 72 may not access the ROM 9 through the common buses. The slave processor 72 can be started by reading out the initialization programs from the high-speed RAM 74. Besides, there is no case that processors connected to a common bus start to access the ROM 9 at once. Thus arbitration on the common bus becomes unnecessary, and so start processing can be performed rapidly.

Besides, the initialization programs which the slave processor 72 is to execute, are stored in the RAM 74. In initialization of the slave processor 72, the initialization programs can be read out in order from the top address of the RAM 74 selected by the address selection signal MS. Therefore, means for judging as to which of the programs each processor is to execute, becomes unnecessary. As a result, the system construction can be simplified.

The above-described embodiments are only for illustrating the present invention. The technical scope of the present invention should not limitedly be interpreted by the embodiments. The present invention can be embodied in various forms without departing from its spirit and features.

Figure 12:
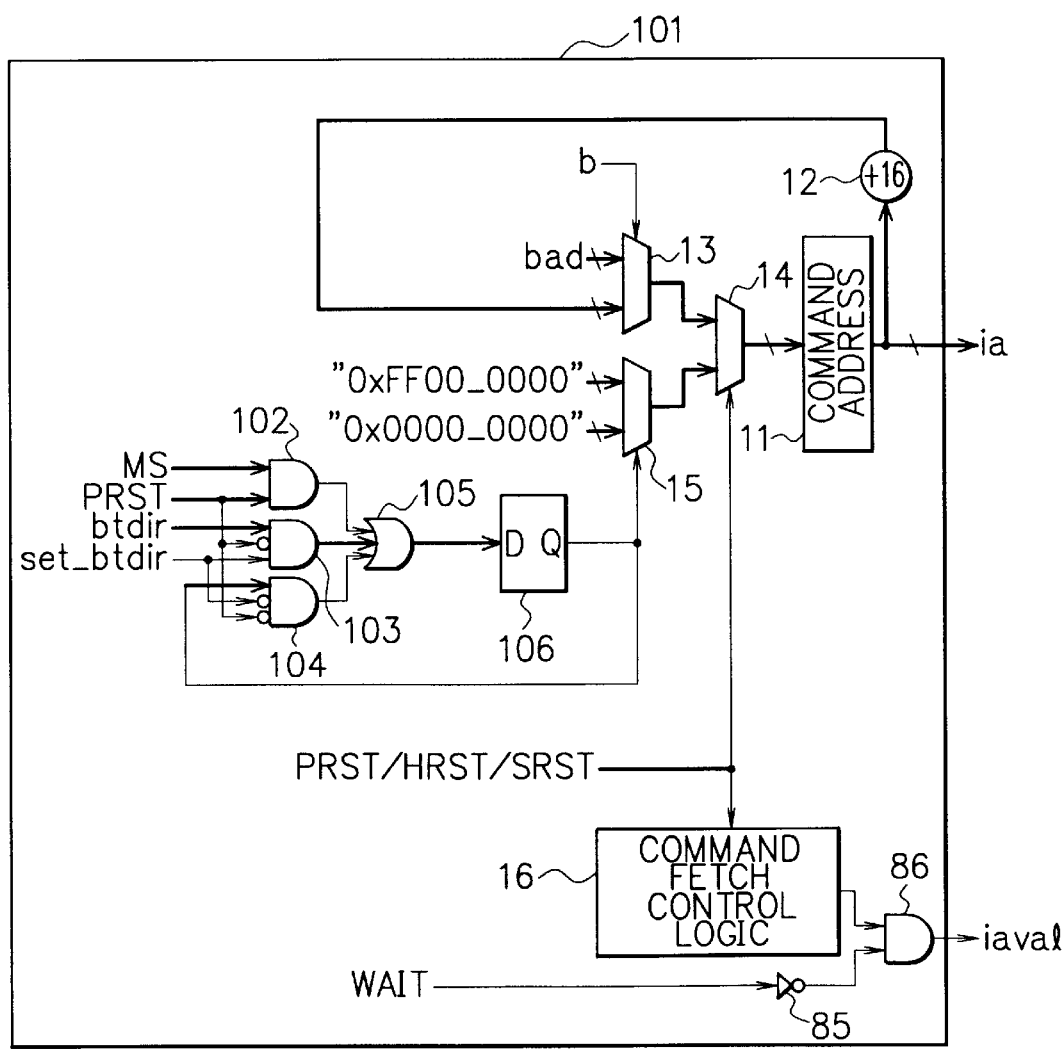
FIG. 12 is a block diagram showing the construction of another example of command fetch control section according to the present invention.

For example, in the above-described embodiments, the start address of the initialization program is selected on the basis of the address selection signal MS which is externally given. But, the selection of the start address may be performed internally. In this case, a command fetch control section can be constructed as shown in FIG. 12. In this example, the selection of a restart address is performed in accordance with the value set in a register in the LSI. In FIG. 12, the same components as those in FIG. 10 are denoted by the same references as those in FIG. 10, respectively.

In the command fetch control section 101 shown in FIG. 12, several logic gates 102 to 105 and a register 106 are added to the command fetch control section 81 shown in FIG. 10. An AND gate 102 performs AND operation between the address selection signal MS and the initial start reset signal PRST, and outputs the resultant signal to an OR gate 105. An AND gate 103 performs AND operation among a signal btdir, a signal set_btdir, and the logically inverted signal of the initial start reset signal PRST, and outputs the resultant signal to the OR gate 105. An AND gate 104 performs AND operation among the logically inverted signal of the signal set_btdir, the logically inverted signal of the initial start reset signal PRST, and the output signal of the register 106, and outputs the resultant signal to the OR gate 105.

The OR gate 105 performs OR operation among the outputs of the AND gates 102 to 104, and outputs the resultant signal to the register 106. By this arrangement, when the initial start reset signal PRST is asserted, the register 106 takes in the value of the address selection signal MS from an external terminal. When the initial start reset signal PRST is negated and the signal set_btdir is asserted, the register 106 takes the signal btdir in. In the other cases, the register 106 keeps its stored value. In this example, either of the signals btdir and set_btdir is asserted by the command executing section 2 executing a write command to the register 106.

The selector 15 selects either address of "0x0000_0000" and "0xFF00_0000" in accordance with the value held by the register 106. For example, when the register 106 holds the value "1", the selector 15 selects the address "0xFF00_0000". When the register 106 holds the value "0", the selector 15 selects the address "0x0000_0000".

In this construction, when the system is powered on, the initial start reset signal PRST is asserted, and the value of the address selection signal MS is taken in from the external terminal, to select a start address of an initialization program. Besides, by setting the value of the register 106 at "0" by the command executing section 2 executing a write command to the register 106 before stopping clock supply, when restarting with the restart reset signal HRST after stopping clock supply, by referring to the value "0" in the register 106, "0x0000_0000" (the top address of the RAM) can be selected as the start address of an initialization program.

In this example, shown is a combination of the external terminal of the address selection signal MS and register setting. But, a construction only by register setting can also be made. Besides, by providing the register 106 in another unit and developing the register 106 on a memory map, the master processor can write data in the register 106 when the slave processor is started. This makes it possible to control the selection of the start address of the initialization program by the master processor.

What is claimed is:

1. A data processing system performing software initialization using an initialization program after performing hardware initialization in response to a reset signal, the system comprising:
   a memory storing the initialization program;
   an address selecting section selecting a start address of the initialization program stored in the memory based on an address selection signal; and
   an area designation register in the address selection section to designate an address area of the memory.

2. The system of claim 1, wherein the memory comprises an external memory connected to a bus and the address selecting section selects the start address of the initialization program stored in the external memory based on the address selection signal, when the reset signal is externally provided when the system is powered on.

3. The system of claim 1, further comprising a local memory, wherein the memory storing the initialization program is an external memory and the initialization program stored in the external memory is transferred to the local memory when the reset signal is externally provided when the system is powered on.

4. The system of claim 1, further comprising an information holding section holding information for distinguishing which of a first reset operation, a second reset operation, and a third reset operation the system has performed,
wherein the information is read out from the information holding section based on a command of the initialization program to perform processing in accordance with a result of the first reset operation, the second reset operation, or the third reset operation.

5. The system of claim 1, wherein the address area of the memory is set in the area designation register after the system is powered on.

6. The system of claim 1, wherein the memory comprises a local memory and the address selecting section selects the start address of the initialization program stored in the local memory based on the address selection signal, when the reset signal is externally provided when a clock supply having been stopped is restarted.

7. The system of claim 6, wherein data other than data necessary for memory access, including an address area of the local memory, is initialized during the hardware initialization when the reset signal is externally provided.

8. The system of claim 6, further comprising a reset internally-generating section internally generating an internal reset signal equivalent to the externally provided reset signal.

9. The system of claim 1, wherein the memory comprises a local memory and the address selecting section selects the start address of the initialization program stored in the local memory based on the address selection signal, when the reset signal is a signal for forcible initialization that is externally provided.

10. The system of claim 9, further comprising a fetch control section controlling command fetch operations for the initialization program, wherein only minimal data, including data in the fetch control section, is initialized during the hardware initialization when the reset signal for forcible initialization is externally provided.

11. The system of claim 9, further comprising a reset internally-generating section internally generating an internal reset signal equivalent to the externally provided reset signal.

12. A data processing system performing software initialization using an initialization program after performing hardware initialization in response to a reset signal, the system comprising:
an access inhibiting section inhibiting an access request to the memory storing the initialization program based on a start inhibiting signal; and
a data transfer section transferring the initialization program from an external memory to a local memory while the start inhibiting signal is applied.

13. The system of claim 12, further comprising an address selecting section selecting a start address of the initialization program stored in the external memory based on an address selection signal, connected to a bus.

14. The system of claim 13, further comprising a first register holding data for defining an address area of the local memory, a second register holding data for internally generating an internal reset signal equivalent to a reset signal provided externally, and a bus master device connected to the bus, wherein the bus master device connected to the bus accesses the first register and the second register.

15. A data processing system comprising data processors connected to a common bus, each of the processors performing software initialization using an initialization program after performing hardware initialization in response to a reset signal, and at least one of the processors comprising:
an external memory connected to a bus and storing the initialization program;
an address selecting section selecting a start address of the initialization program stored in the external memory based on an address selection signal;
an access inhibiting section inhibiting any access requests to the external memory storing the initialization program, based on a start inhibiting signal;
a local memory; and
a data transferring section transferring the initialization program from the external memory to the local memory while the access inhibiting section inhibits any access requests to the local memory, the address selecting section selecting the start address of the initialization program stored in the local memory based on the address selection signal, after the access requests to the local memory are no longer inhibited.

16. The system of claim 15, wherein the data transferring section transfers the initialization program using a direct memory access controller (DMAC) for direct transference between the external memory and the local memory.

17. A data processing system performing software initialization using an initialization program after performing hardware initialization in response to a reset signal, the system comprising:
an address selection section selecting a start address of the initialization program stored in the memory based on an address selection signal; and
a reset register in the address selection section that stores a first reset signal and a second reset signal.

18. The system of claim 17, wherein the first reset signal is provided when the system is powered on.

19. The system of claim 17, wherein the second reset signal is provided when a clock supply is restarted.

20. The system of claim 17, wherein the reset register stores a third reset signal for forcible initialization.

21. A data processing method performing software initialization using an initialization program after performing hardware initialization in response to a reset signal, the method comprising:
determining whether a request address exists within an address area for a local memory;
selecting a start address of the initialization program stored in the local memory when the request address exists within the address area for the local memory; and
selecting the start address of the initialization program stored in an external memory when the request address does not exist within the address area for the local memory.

22. The method of claim 21, wherein the address area for the local memory is in an area designation register that designates an address area of the local memory.

23. A data processing method for software initialization, comprising:
determining whether a request address for an initialization program exists within an address area for a local memory;
selecting a start address of the initialization program stored in the local memory when the request address exists within the address area for the local memory; and selecting the start address of the initialization program stored in an external memory when the request address does not exist within the address area for the local memory.

24. A data processing method for software initialization, comprising:

issuing a request address for an initialization program in an external memory when a system is powered on;

transferring the initialization program from the external memory to a local memory;

setting an address area for the local memory in an area designation register; and accessing the local memory for the initialization program after the system is powered on.

25. The method of claim 24, wherein the local memory is accessed when an internal clock is restarted after the system is powered on.

26. A data processing method performing software initialization using an initialization program read from a memory after performing hardware initialization in response to a reset signal, the method comprising:

inhibiting an access request to the memory storing the initialization program based on a start inhibiting signal; and transferring the initialization program from an external memory to a local memory while the start inhibiting signal is applied.

27. A data processing method performing software initialization, comprising:

accessing an external memory when a first reset signal indicates that a data processing system is powered on;

transferring an initialization program from an external memory to a local memory;

accessing the local memory when a second reset signal indicates that a clock supply is restarted; and initializing the data processing system using the initialization program from the local memory.

* * * * *